United States Patent
Sternowski

(10) Patent No.: US 11,398,845 B1
(45) Date of Patent: Jul. 26, 2022

(54) ADAPTIVE COMBINER FOR RADIO TRANSMITTERS

(71) Applicant: SOFTRONICS LTD., Marion, IA (US)

(72) Inventor: Robert Sternowski, Cedar Rapids, IA (US)

(73) Assignee: SOFTRONICS LTD., Marion, IA (US)

(*) Notice: Subject to any disclaimer, the term of this patent is extended or adjusted under 35 U.S.C. 154(b) by 0 days.

(21) Appl. No.: 17/707,467

(22) Filed: Mar. 29, 2022

Related U.S. Application Data

(60) Provisional application No. 63/282,816, filed on Nov. 24, 2021.

(51) Int. Cl.
| | |
|---|---|
| H04B 1/06 | (2006.01) |
| H04B 1/16 | (2006.01) |
| H04B 1/04 | (2006.01) |
| G02B 6/126 | (2006.01) |
| H04Q 11/00 | (2006.01) |
| H04B 1/00 | (2006.01) |

(52) U.S. Cl.
CPC .......... H04B 1/1615 (2013.01); H04B 1/006 (2013.01); H04B 1/0458 (2013.01); H04B 2001/0408 (2013.01)

(58) Field of Classification Search
None
See application file for complete search history.

(56) References Cited

U.S. PATENT DOCUMENTS

| | | | | |
|---|---|---|---|---|
| 7,028,281 | B1* | 4/2006 | Agrawal | H03K 19/17784 326/41 |
| 9,282,384 | B1* | 3/2016 | Graves | H04Q 11/0005 |
| 2016/0044393 | A1* | 2/2016 | Graves | H04Q 11/0005 398/51 |
| 2016/0334575 | A1* | 11/2016 | Graves | H04Q 3/526 |

FOREIGN PATENT DOCUMENTS

| | | | | |
|---|---|---|---|---|
| CN | 102089933 B | * | 6/2014 | H01Q 1/246 |
| CN | 107534506 A | * | 1/2018 | H04Q 11/0003 |

OTHER PUBLICATIONS

Mini-Circuits, Understanding Power Splitters, Apr. 14, 2015, 8 pages.

* cited by examiner

*Primary Examiner* — Pablo N Tran
(74) *Attorney, Agent, or Firm* — Shuttleworth & Ingersoll, PLC; Jason R. Sytsma

(57) ABSTRACT

An n-number of input ports, a plurality of output ports equal to $\Sigma_{k=2}^{n+1}(k-1)$, and a plurality of switches selectively connecting the n input ports to the plurality of output ports. A combiner network comprising n−1 combiners is connected to the plurality of output ports and one input port is directly connected to an output port to provide n output ports of the combiner network. A second stage switching matrix comprising n input ports is connected to the n output ports of the combiner network for selectively connecting one of the n output ports of the combiner network to an output load.

20 Claims, 3 Drawing Sheets

ADAPTIVE COMBINER FOR RADIO TRANSMITTERS

TECHNICAL FIELD

This disclosure describes an adaptive combiner for high power radio transmitters, and more specifically, a more power-efficient circuit and method of combining the power of multiple high power radio amplifiers into a single output with one or more failed amplifiers.

BACKGROUND INFORMATION

It is well known to radio engineers that a high power transmitter may be constructed from a single high power amplifier stage with the desired power output level, or by linearly summing multiple in-phase lower power amplifiers into a single desired output level. Both approaches are functionally equivalent, and the reason for selecting one approach over the other are many and varied. One of the advantages of the multi-amplifier summing approach is failure tolerance, that is, if one small amplifier fails, the sum of output powers will degrade but not drop to zero. On the other hand, if a single high power amplifier fails, all output power is lost.

Accordingly, there is a need for maximizing the output power of a summing network of a multi-amplifier architecture.

SUMMARY

According to this disclosure, provided is an electric circuit comprising a switching matrix comprising an n-number of input ports where n is a natural number, a plurality of output ports equal to $$\sum_{k=2}^{n+1}(k-1),$$

and a plurality of switches selectively connecting the n input ports of the switching matrix to the plurality of output ports of the switching matrix. A combiner network is connected to the plurality of output ports of the switching matrix and comprising n−1 combiners and one input port directly connected to an output port to provide n output ports of the combiner network. A second stage switching matrix comprising n input ports is connected to the n output ports of the combiner network for selectively connecting one of the n output ports of the combiner network to an output load.

In one or more embodiments, the second stage switching matrix selectively connects one of the n output ports of the combiner network to an output load based on an input power to the n input ports of the switching matrix. Each one of the n input ports of the switching matrix are connectable to one of a corresponding n amplifiers. The plurality of switches of the switching matrix are operable to selectively disconnect one or more failed amplifiers from all of the output ports of the switching matrix. The plurality of switches of the switching matrix are operable to selectively connect two or more remaining amplifiers directly to the one of the n−1 combiners comprising a number of input ports equal to the number of remaining amplifiers. The plurality of switches of the switching matrix are operable to connect one amplifier directly to the output port of the combiner network for a 1:1 power transfer from the amplifier to the output port of the combiner network when all of the other n amplifiers fail.

In another embodiment, only one output port of the combiner network is operably connectable to the output load by the second stage switching matrix. It is also contemplated that n sensors each one of which can be connected to one of the n input ports to the switching matrix and a microprocessor can be connected to the switching matrix for operably controlling the plurality of switches of the switching matrix in response to signals received from the n sensors. The n sensors can each be power meters and the microprocessor disconnects the input port from the output ports of the switching matrix in response to a lack of power on the input port.

The second stage switching matrix can be a single row matrix that selectively connects one of the n input ports of the second stage switching matrix directly to the output load. Alternatively, the second stage switching matrix can comprise a plurality of rows each having an output port connected one of a plurality of output loads to selectively connect one of the n input ports of the second stage switching matrix to any one of the one of the plurality of output loads.

In yet another embodiment, disclosed is a method for reconfiguring an output if a circuit element providing an input fails. The method can comprise receiving at corresponding n input ports of a switching matrix, signals from one of n circuit elements, where n is a natural number; providing a plurality of output ports from the switching matrix equal to $$\sum_{k=2}^{n+1}(k-1);$$

providing a plurality of switches in the switching matrix; connecting selectively with the plurality of switches the n input ports of the switching matrix to the plurality of output ports of the switching matrix; providing a combiner network comprising of n−1 combiners and one input port directly connected to an output port of the combiner network to provide n input ports and n output ports of the combiner network; and providing a plurality of switches in a second stage switching matrix comprising n input ports connected to the n output ports of the combiner network for selectively connecting one of the n output ports of the combiner network to an output load.

In an embodiment, the method can comprise of connecting selectively with the second stage switching matrix one of the n output ports of the combiner network to an output load based on an input power to the n input ports of the switching matrix, and connecting selectively one of the n input ports of the switching matrix to one of a corresponding n amplifiers. The method can also comprise disconnecting one or more failed circuit elements providing the input to the switching matrix from all of the output ports of the switching matrix.\

The method can further comprise one or more of connecting selectively two or more remaining circuit elements directly to the one of the n−1 combiners comprising a number of input ports equal to the number of remaining amplifiers; connecting one circuit element directly to the output port of the combiner network for a 1:1 power transfer from the circuit element to the output port of the combiner network when all of the other n amplifiers fail; and connecting only one output port of the combiner network to the output load using the second stage switching matrix.

In other embodiments, the methods can comprise providing n sensors each one of which is connected to one of the n input ports to the switching matrix and a microprocessor connected to the switching matrix, and controlling the plurality of switches of the switching matrix in response to signals received from the n sensors. In other embodiments, the method can, where the n sensors are each power meters, disconnecting with a microprocessor the input port from the output ports of the switching matrix in response to a lack of power on the input port; wherein the second stage switching matrix is a single row matrix, and further comprising connecting selectively one of the n input ports of the second stage switching matrix directly to the output load.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
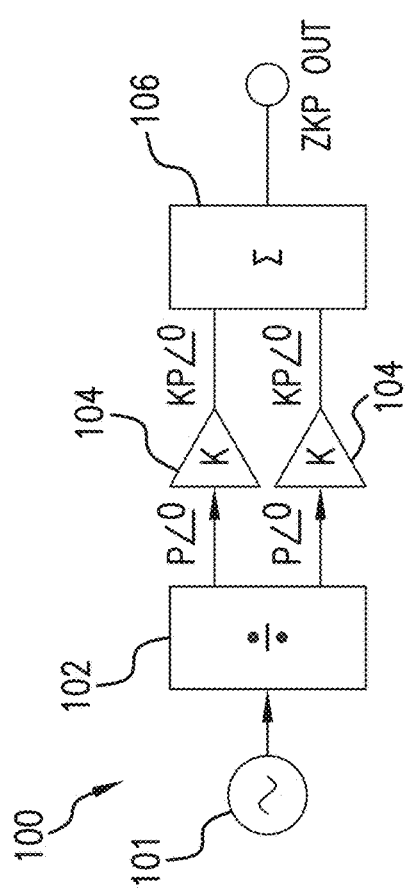
FIG. 1 is a prior art schematic of a multi-amplifier summing circuit.

Referring to FIG. 1, shown is a prior art schematic of a multi-amplifier summing circuit 100, which is also interchangeably known as a combining circuit. A source 101 provides an input signal. A divider 102 (also known as a splitter) splits the input signal into two equal power and in-phase signals. Each of these signals is then independently provided to an amplifier 104 for amplification where each signal is still in-phase with equal power. Each of the amplified signals is then provided to a single output combiner 106. The circuit elements can be active or passive or any combination of active or passive circuit elements. Also, one skilled in the art will note that the signals need not be in-phase in a multiple amplifier summing architecture. Other phased architectures exist and may be employed in the claimed invention with substantially equal function and results. An in-phase architecture is the simplest both in construction and for purposes of description.

Figure 2:
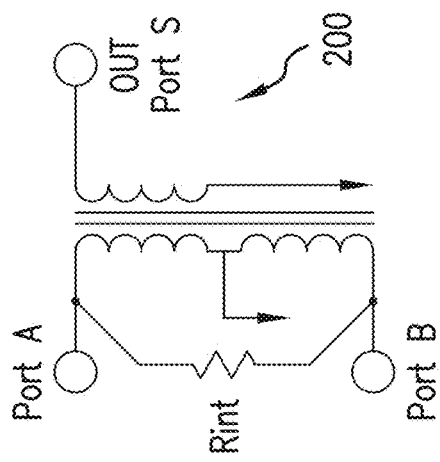
FIG. 2 is a prior art schematic of a multi-amplifier summing circuit with a transformer combiner.

FIG. 2 shows passive combiner 106 implemented as a passive transformer circuit 200. Transformer circuit 200 receives an input signal applied to port A will cause a current to flow through the transformer and experience a 180° phase shift by the time it arrives at port B. Similarly, a current will also flow through the resistor, Rint and will not experience a phase shift by the time it arrives at port B. When Rint equals the impedance value across the transformer ends then, the currents appearing at port B will be equal in amplitude but opposite in phase and cancel. The net result is that no voltage appears at port B from the input signal applied at port A.

As applied to FIG. 1, combiner 106 receives the amplified signal from amplifiers 104 and combines them into a single output. Transformer circuit 200 has two equal input windings and a single secondary output winding. Rint is equal to the impedance of the secondary winding to provide isolation between the two inputs, Port A and Port B.

Transformer circuit 200 can also be used for divider 102. As divider 102, a signal applied at port S will be split so that identical signals appear at ports A and B, due to the circuit symmetry. If the impedance values are matched then maximum power transfer will take place and half the input power would appear at each port resulting in a 3 dB theoretical loss at each port.

If two amplifier signals are identical in phase and power, an ideal combiner 106 would output the lossless sum of the amplifier powers. If the two amplifier signals are unequal, however, the difference between the two power inputs would be dissipated by the balance resistor as heat and subtracted from the delivered output power. Therefore, if one amplifier fails and delivers 0 power to combiner 106, then half of the working amplifier's power will be delivered to the output and the other half dissipated as heat by the balancing resistor in combiner 106.

Figure 3:
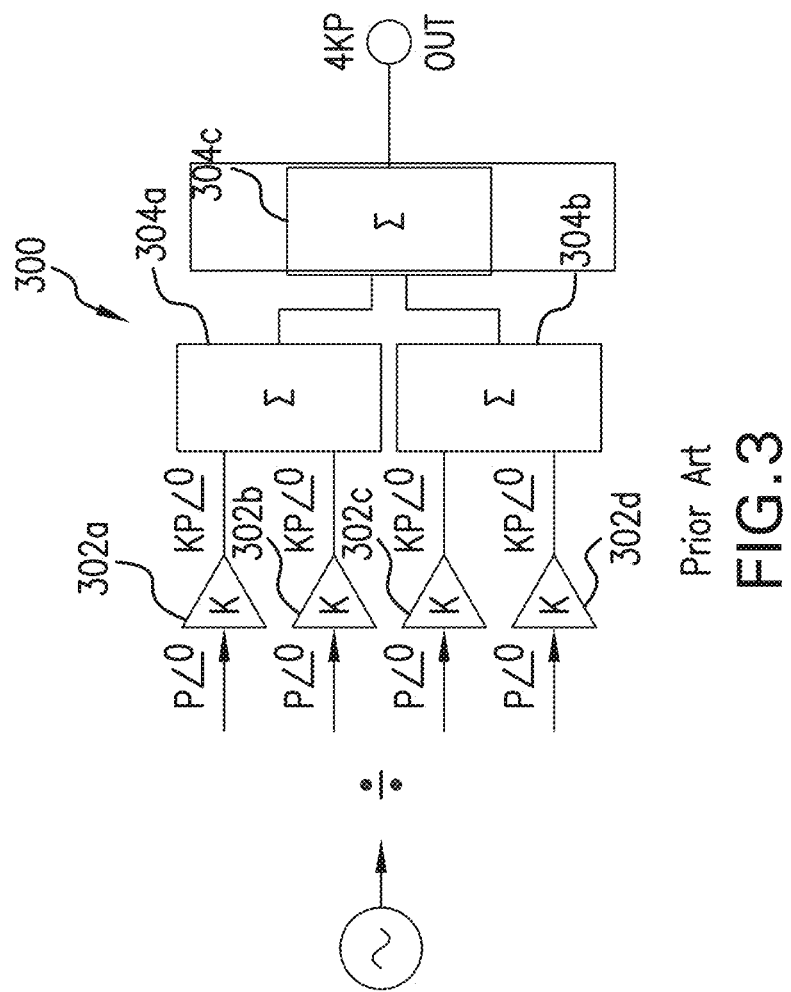
FIG. 3 is a schematic of prior art four-way combiner circuit.

A more significant example is the case with four amplifiers and a four-way combiner, as shown in FIG. 3, which shows the classical prior art manner of combining a large number of amplifiers 302. This is implemented as a binary tree, where an integer power of two quantity of amplifiers is applied to a binary-tree network of two-way combiners. All four amplifiers are of equal power output and in-phase of power, P. With all four amplifiers 302 operational, the output power is 4×P. Assuming amplifier 302a fails, a combiner 304a would see zero power at one port and power P at the other port. Half the power is dissipated in the balance resistor, so combiner 304a outputs P/2 power. Combiner 304c sees P/2 at one input port and 2P from the other input port (from combiner 304b, which has two functioning amplifiers). But the balancing resistor in combiner 304c will dissipate a portion of the difference in power between port A and port B, P/2 and 2P, respectively, so the powers from combiners 304a and 304b into the inputs of combiner 304c will be summed and 2P will be outputted. Thus, with a system of amplifiers capable of 4P output power, the failure of ONE amplifier causes the summed output power to decrease to only P, a decrease of 75%.

The failure of two amplifiers applied to combiner 304a causes combiner 304c to output half of the applied 2P power, or P power output. The failure of one amplifier to combiner 304a and one amplifier to combiner 304b results in 0.5P output from combiners 304a and 304b, and causes combiner 304c to see equal 0.5P power at each input and thus sum that to P output power. Finally, the failure of three amplifiers causes combiner 304c to see zero and 0.5P at its inputs with half the power loss to the balance resistor for an output of 0.25P.

As can be seen, the failure of one amplifier in a typical two amplifier combined system is a key weakness that an adaptive combiner disclosed herein is designed to improve upon. Rather than lose half of the amplifier power in heat, an adaptive combiner can sense the failure of one or more amplifiers and automatically reconfigure the combiner architecture to allow the full power of the surviving amplifier to be delivered to the output port.

Disclosed is an adaptive combiner 400 comprising of a switching matrix 402 and an n-stage combiner network 403 that reconfigures the output of switching matrix 402 to n-stage combiner network 403 to maximize the output power of n-stage combiner network 403 if one of the inputs to adaptive combiner 400 fails. The inputs to adaptive combiner 400 can be any active electrical device, but the illustrated embodiment is directed to one or more high power amplifiers 404a-404n. The output of adaptive combiner 400 can be any type of an output load, which is any component, circuit device, piece of equipment, or system which consumes, dissipates, radiates, or otherwise uses power, including, but not limited to, antennas, amplifiers, receivers, resistors, transmitters, transceivers, RF equipment, etc.

More specifically, switching matrix 402 comprises an n-number of input ports where n is a natural number and a plurality of output ports equal to $$\sum_{k=2}^{n+1}(k-1)$$

ithin switching matrix 402 is a plurality of switches selectively connecting the n input ports of switching matrix 402 to the plurality of output ports of switching matrix 402. With each input port being designated $y_1$-$y_n$ and each output port being designated $x_1$ to $x_{(summation\ formula\ above)}$, each switch is identified by an x,y coordinate. Switching matrix 402 can be any type of switching matrix including a cross-point, cross-bar, Tree Mux, non-blocking, or hybrid.

The outputs of switching matrix 402 are connected to combiner network 403 comprising n−1 combiners. A first combiner 410 in combiner network 403 comprises n input ports and one output port. The output of each n−1 combiners is connected to a second stage switching matrix 416 to switch the output of the corresponding combiner to an output 418. The output of each n−1 combiners is selectively connectable to one and only one of the input ports of the switching matrix at a time.

The input ports of switching matrix 402 are operably connectable to one of a corresponding amplifiers 404a-404n, again where n is a whole number corresponding to the n input ports of switching matrix 402. The plurality of switches are operable to selectively disconnect one or more failed amplifiers 404a-404n from all of the output ports of switching matrix, and to selectively connect two or more remaining amplifiers 404a-404n directly to the one of the n−1 combiners comprising a number of input ports equal to the number of remaining amplifiers. In the event of all but one amplifier 404a-404n failing, the plurality of switches are operable to connect one amplifier 404a-404n directly to the output port of the combiner network for a 1:1 power transfer from the one remaining amplifier 404a-404n to the output port of combiner network 403. When the output of combiner network 403 is operably connected to an output load 416, a 1:1 power transfer from the one remaining amplifier 404a-404n to output load 416 is provided so that there is not a total failure of the transmitter.

In the illustrated embodiment, n=4 and shown are four amplifiers 404a-404d connected to four inputs to switching matrix 402 having 10 output ports $$\left(\sum_{k=2}^{n+1}(k-1)=10\ \text{where}\ n=4.\right.$$

Adaptive combiner 400 will continue delivering the full input power from each operating amplifier 404a-404d when one or more of amplifiers 404a-404d fails. In a four-amplifier system 404a-404d, when one amplifier 404 fails, adaptive combiner 400 will continue delivering 3P, rather than a mere 1P of the prior art systems. If two amplifiers 404 fail, adaptive combiner 400 will continue delivering 2P, rather than 1P of the prior art systems. If three amplifiers 404 fail, adaptive combiner 400 will continue delivering 1P, rather than 0.25P of the prior art systems. This is a significant improvement over prior art systems where failure of 1 amplifier reduces the output power of the remaining amplifiers. In essence, switching matrix 402 removes the failed amplifier 404 from the network so that it does not drag down the operation of the transmitter.

Figures 4, 4A:
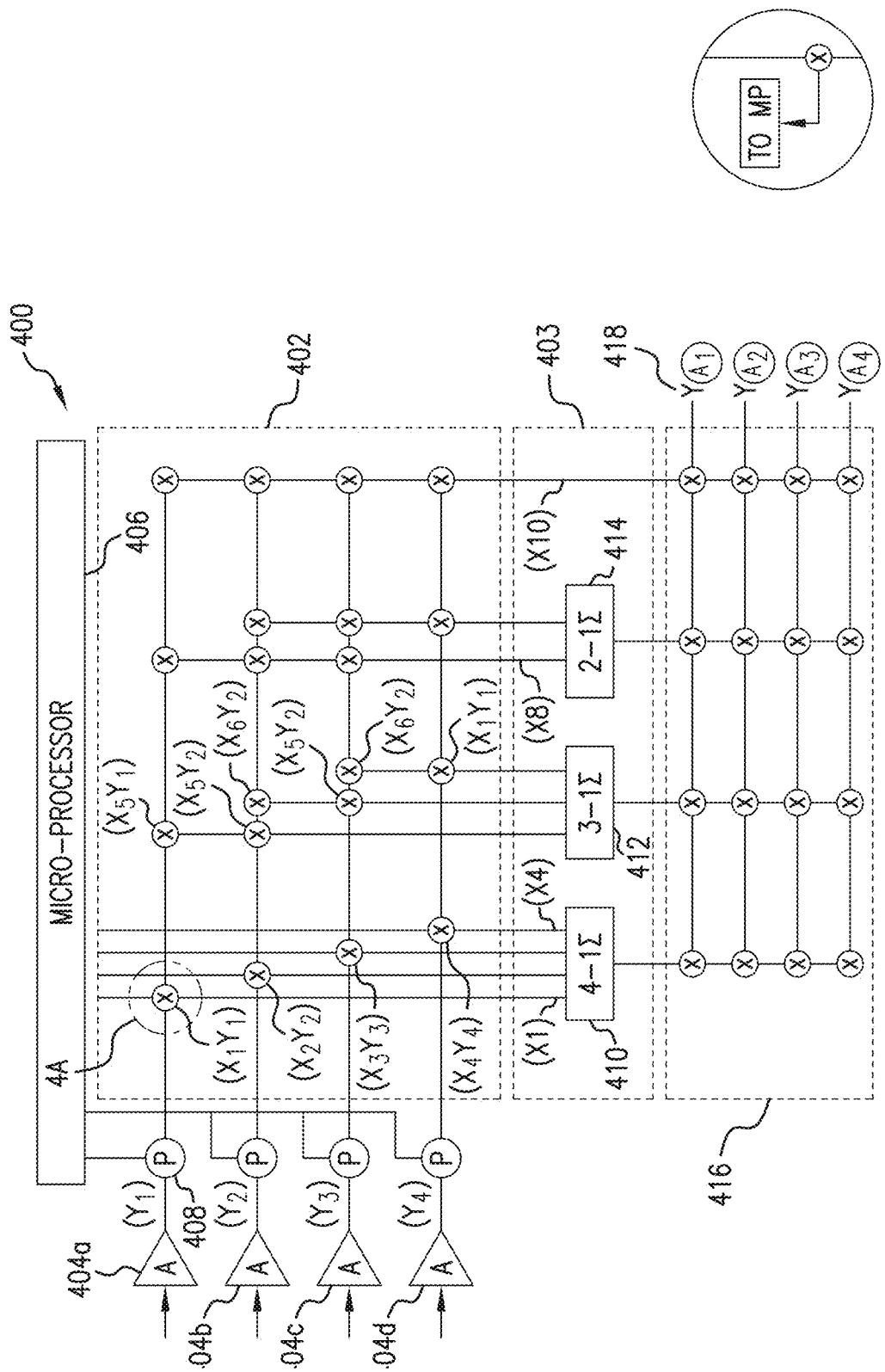
FIG. 4 is a schematic of a four amplifier adaptive combiner with four switched output loads according to this disclosure.
FIG. 4A is a close-up view of area 4A of FIG. 4 of an exemplary switch of the switching matrixes described herein.

In this example, the input power from each constituent amplifier 404a-404d to switching matrix 402 may be determined from a microprocessor 406 with power metering and intelligence built into switching matrix 402 or separate from with external control and a power sensor 408 for providing configuration input data to microprocessor 406 of adaptive combiner 400. Each power sensor 408 can be connected to microprocessor 406 so that it can sense whether there is power from each of the corresponding amplifiers 404a-n. It should be understood, that any sensor to detect the failure of amplifiers 404 can be used, including voltage or current sensors, as well as power sensors 408. In such implementations, n sensors are provided. Each one of which is connected to one of the n input ports to switching matrix 402. Microprocessor 406 is connected to switching matrix 402 for operably controlling the plurality of switches in response to signals received from the n sensors. FIG. 4A shows a close-up view of area 4A of FIG. 4 which shows an exemplary switch in switching matrix 402. All of the switches are controllable in this manner. For sensors implemented as power sensors 408, microprocessor 406 disconnects the input port from the output ports of the switching matrix 402 in response to a lack of power on the input port which corresponds to a failed amplifier 404.

In a four-input switching matrix 402, four inputs Y1-Y4 and 10 outputs X1-X10 are provided. Internal to switching matrix 402 are corresponding single pole, single throw (SPST) switches that can be identified by the corresponding output to input coordinates. Each switch, as shown in FIG. 4A, of switching matrixes 402 and 416 is also connected and in communication with microprocessor 406 for control by microprocessor 406. When all amplifiers 404a-404d are operational, switches (x1, y1) through (x4, y4) are closed and all the remaining switches opens so that the output of each amplifier 404a-404d is fed directly out of switching matrix 402 and into corresponding input ports of a 4-1 combiner 410 that produces an output power of 4P.

If one amplifier fails, switches (x1, y1) through (x4, y4), (x8, y1) through (x10, y4), and the switches connecting the failed amplifier to the output are all opened, so that the remaining operational amplifiers 404 are fed directly out of switching matric 402 and into corresponding input ports of a 3-1 combiner 412 that produces an output power of 3P.

If two amplifiers fail, switches (x1, y1)-(x7, y4), (x10, y1)-(x10, y4), and the switches connecting the failed amplifier to the output are all opened, so that the remaining operational amplifiers 404 are fed directly out of switching matric 402 and into corresponding input ports of a 2-1 combiner 414 that produces an output power of 2P.

Finally, if three amplifiers fail, switches (x1, y1)-(x9, y4) and the switches connecting the failed amplifier to the output are all opened, so that the remaining operational amplifier 404 is fed directly out of switching matric 402 to produce an output power of P for a 1:1 power transfer to output load 418.

As can be seen, adaptive combiner 400 allows all of the power of the operating amplifiers 404a-404n to contribute to the output power of adaptive combiner 400. In other words, N-operating amplifiers each providing an output power (P) will produce N*P output power with switching matrix 402 switching out the failed amplifiers 404 and directing the signals to the corresponding stage "N" of n-stage combiner network 403 where "n" is the number of inputs to amplifiers 404a-404n.

The output of n-stage combiner network 403 is connected to second stage switching matrix 416 to switch the output of the corresponding combiner to output 418. Second stage switching matrix 416 can be implemented as a single row matrix of switches corresponding to a y1-y4 input lines and a single output line A1. All of the switches, like the switch shown in FIG. 4A, are also connected to microprocessor 406 for control so that 1 and only 1 combiner 410-414 with a non-zero output power is feeding into output 418, which is necessary to maintain a 50 ohm impedance match required for communication systems. If the output power from combiners 410-414 is to be applied to more than one output destination, then a second stage switching matrix 416 can be implemented with a corresponding number of rows each of which connected to its own output 418, again with microprocessor 406 controlling the opening and closing of switches to route the output of combiners 410-414, for example, to one and only one output load 418.

The methods of achieving different numbers of input ports in the combiner network may be accomplished with individual combiners of differing sizes connected to a common switch matrix, using a switchable/tapped single combiner, or by other means and combiner types well known to radio engineers. Not all consecutive natural number combiner inputs complements need be implemented; a partial matrix may be configured if this serves a particular application. This method can be applied to any number of amplifiers to be combined by scaling the adaptive combiner's switch matrix and combiners accordingly.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. An electric circuit comprising:
 a switching matrix comprising an n-number of input ports where n is a natural number, a plurality of output ports equal to $$\sum_{k=2}^{n+1}(k-1),$$

and a plurality or switches selectively connecting the n input ports of the switching matrix to the plurality of output ports of the switching matrix; and a combiner network connected to the plurality of output ports of the switching matrix and comprising n-1 combiners and one input port directly connected to an output port to provide n output ports of the combiner network for selectively connecting one of the n output ports of the combiner network to an output load.

2. The electric circuit of claim 1, and further comprising a second stage switching matrix between the combiner network and the output load, the second stage switching matrix comprising n input ports connected to the n output ports of the combiner network for selectively connecting one of the n output ports of the combiner network to the output load, wherein the second stage switching matrix selectively connects one of the n output ports of the combiner network to the output load based on an input power to the n input ports of the switching matrix.

3. The electric circuit of claim 2, wherein the second stage switching matrix is a single row matrix that selectively connects one of the n input ports of the second stage switching matrix directly to the output load.

4. The electric circuit of claim 2, wherein the second stage switching matrix comprises a plurality of rows each having an output port connected one of a plurality of output loads to selectively connect one of the n input ports of the second stage switching matrix to any one of the one of the plurality of output loads.

5. The electric circuit of claim 1, wherein each one of the n input ports of the switching matrix are connectable to one of a corresponding n amplifiers.

6. The electric circuit of claim 5, wherein the plurality of switches of the switching matrix are operable to selectively disconnect one or more failed amplifiers from all of the output ports of the switching matrix.

7. The electric circuit of claim 6, wherein the plurality of switches of the switching matrix are operable to selectively connect two or more remaining amplifiers directly to the one of the n−1 combiners comprising a number of input ports equal to the number of remaining amplifiers.

8. The electric circuit of claim 7, wherein the plurality of switches of the switching matrix are operable to connect one amplifier directly to the output port of the combiner network for a 1:1 power transfer from the amplifier to the output port of the combiner network when all of the other n amplifiers fail.

9. The electric circuit of claim 1, wherein only one output port of the combiner network is operably connectable to the output load by the second stage switching matrix.

10. The electric circuit of claim 1, and further comprising n sensors each one of which is connected to one of the n input ports to the switching matrix and a microprocessor connected to the switching matrix for operably controlling the plurality of switches of the switching matrix in response to signals received from the n sensors.

11. The electric circuit of claim 1, wherein the n sensors are each power meters and the microprocessor disconnects the input port from the output ports of the switching matrix in response to a lack of power on the input port.

12. A method for reconfiguring an output if a circuit element providing an input fails, the method comprising:
 receiving at corresponding n input ports of a switching matrix, signals from one of n circuit elements, where n is a natural number;
 providing a plurality of output ports from the switching matrix equal to $$\sum_{k=1}^{n+1}(k-1);$$

providing a plurality of switches in the switching matrix;

connecting selectively with the plurality of switches the n input ports of the switching matrix to the plurality of output ports of the switching matrix; and providing a combiner network comprising of n−1 combiners and one input port directly connected to an output port of the combiner network to provide n input ports and n output ports of the combiner network for selectively connecting one of the n output ports of the combiner network to an output load.

13. The method of claim 12, and further comprising providing a plurality of switches in a second stage switching matrix between the combiner network and the output load, the second stag switching matrix comprising n input ports connected to the n output ports of the combiner network and connecting selectively with the second stage switching matrix one of the n output ports of the combiner network to the output load based on an input power to the n input ports of the switching matrix.

14. The electric circuit of claim 13, wherein the n sensors are each power meters, and further comprising disconnecting with a microprocessor the input port from the output ports of the switching matrix in response to a lack of power on the input port; wherein the second stage switching matrix is a single row matrix, and further comprising connecting selectively one of the n input ports of the second stage switching matrix directly to the output load.

15. The method of claim 12, connecting selectively one of the n input ports of the switching matrix to one of a corresponding n amplifiers.

16. The method of claim 15, disconnecting one or more failed circuit elements providing the input to the switching matrix from all of the output ports of the switching matrix.

17. The method of claim 16, connecting selectively two or more remaining circuit elements directly to the one of the n−1 combiners comprising a number of input ports equal to the number of remaining amplifiers.

18. The method of claim 17, connecting one circuit element directly to the output port of the combiner network for a 1:1 power transfer from the circuit element to the output port of the combiner network when all of the other n amplifiers fail.

19. The method of claim 18, connecting only one output port of the combiner network to the output load using a second stage switching matrix.

20. The method of claim 12, providing n sensors each one of which is connected to one of the n input ports to the switching matrix and a microprocessor connected to the switching matrix, and controlling the plurality of switches of the switching matrix in response to signals received from the n sensors.

* * * * *